United States Patent

[11] 3,596,938

| [72] | Inventor | Henry James Tizzard<br>Filton, Bristol, England |
|---|---|---|
| [21] | Appl. No. | 847,248 |
| [22] | Filed | Aug. 4, 1969 |
| [45] | Patented | Aug. 3, 1971 |
| [73] | Assignee | Rolls-Royce Limited<br>Derby, England |
| [32] | Priority | Aug. 3, 1968 |
| [33] | | Great Britain |
| [31] | | 37137/68 |

[54] FLEXIBLE JOINT
4 Claims, 6 Drawing Figs.

[52] U.S. Cl. ..................................................... 285/231,
285/261, 285/318
[51] Int. Cl. ..................................................... F16l 17/02

[50] Field of Search ............................................. 285/318,
263, 267, 268, 269, 244, 223, 231, 232, 261;
339/256 S; 85/32 CS, 64; 151/14 CS

[56] References Cited
UNITED STATES PATENTS

| 1,543,348 | 6/1925 | Venton .......................... | 285/267 |
| 2,067,768 | 1/1937 | Krefft ........................... | 285/263 |
| 3,010,745 | 11/1961 | Blomstrand et al. ........... | 85/64 X |
| 3,047,315 | 7/1962 | Kinnison ...................... | 285/269 |

Primary Examiner—Thomas F. Callaghan
Attorney—Mawhinney and Mawhinney

ABSTRACT: The disclosure of this invention pertains to a joint comprising an outer part, an inner part and a junction piece between said parts in the form of a coiled spring having at least one turn engaging only the outer part and at least one turn engaging only the inner part.

PATENTED AUG 3 1971

INVENTOR
HENRY JAMES TIZZARD
BY: Mawhinney & Mawhinney
ATTYS.

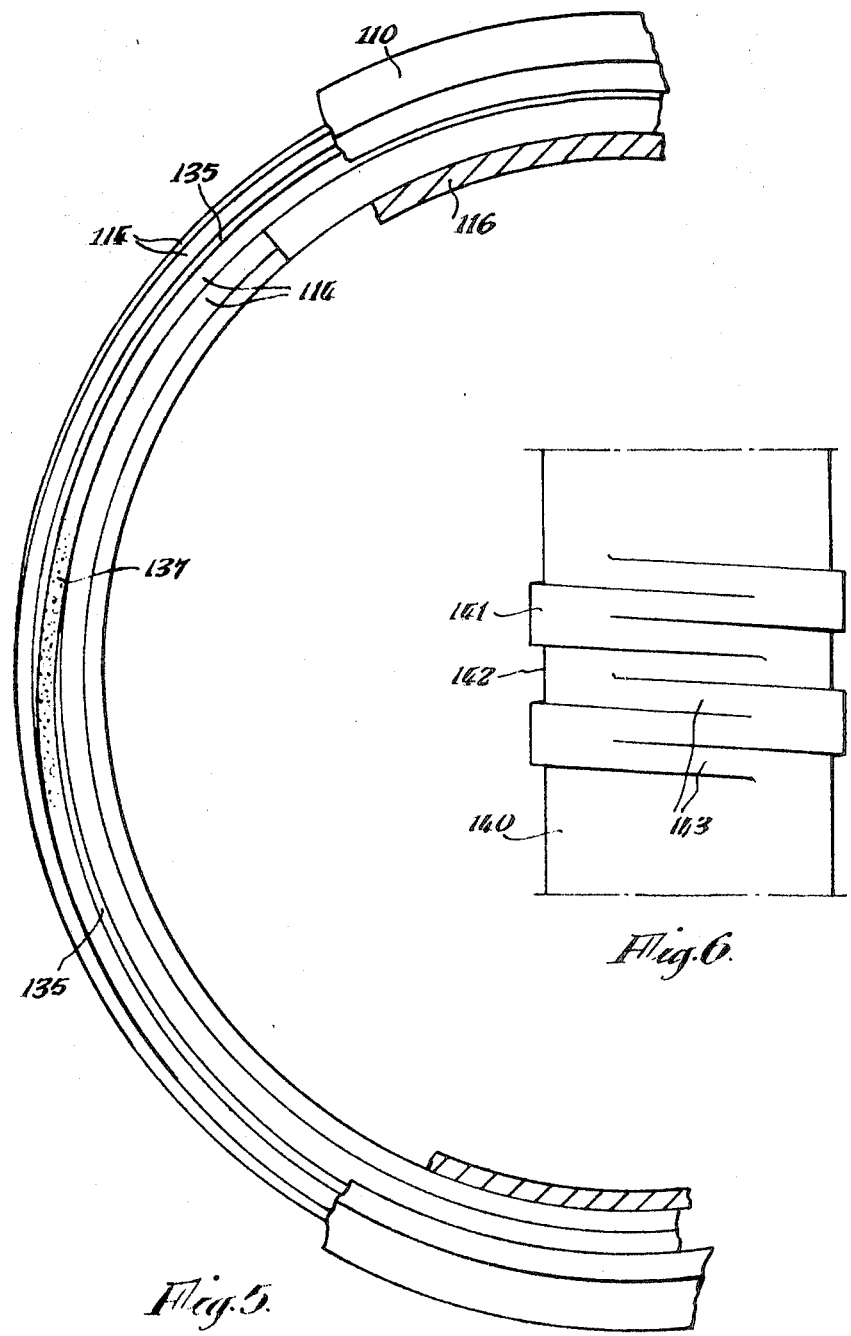

FLEXIBLE JOINT

This invention relates to flexible joints.

According to this invention a flexible joint comprises a hollow outer part, an inner part arranged within the outer part, and a resilient member situated between the parts in engagement therewith, characterized in that the resilient member comprises a coiled spring having at least one outer turn dimensioned to engage the outer part and be clear of the inner part, and at least one inner turn dimensional to engage the inner part and be clear of the outer part.

The resilient engagement by the spring respectively with the inner and outer parts provides a resilient connection between the parts, for example for the purpose of damping vibrations directed transversely to the axes of the parts. The spring, being a single component, provides the advantages flowing from simplicity of construction. Further, being essentially capable of being made of an inorganic heat-resisting material, e.g. steel, the spring can provide better heat resistance than an organic elastomer such as rubber.

The spring comprises an intermediate portion extending between the or one of the outer turns and the or one of the inner turns adjacent thereto, and these turns may be dimensioned to radially overlap the intermediate portion to be capable of axial sealing contact therewith and dimensioned to make peripheral sealing contact respectively with the outer and inner part.

The outer part may have a spherical inner surface engaged by said outer turn or turns thereby to support the parts for relative universal motion.

The hollow outer part may include a portion defining an opening which is smaller than the outer diameter of said outer turn or turns, and the spring may be dimensioned in relation to the opening to be radially contractable for being passed through the opening.

Examples of a joint according to this invention will now be described with reference to the accompanying drawings wherein:

FIG. 5 is a fragmentary end view of FIG. 4.

FIG. 6 is an elevation of a mandrel, drawn to a reduced scale, for use in the manufacture of the spring which is a part of the joint shown in FIGS. 4 and 5.

Figure 1:
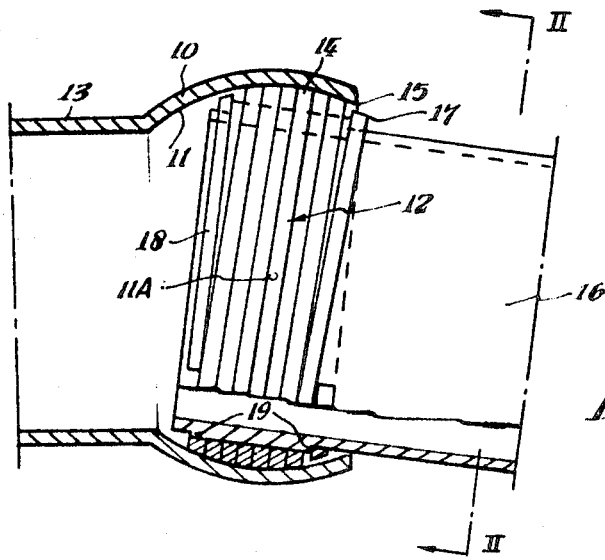
FIG. 1 is a partly sectioned elevation of the joint in the assembled condition.

Referring to FIG. 1, a hollow outer part or socket 10, provided at one end of a tube 13, is connected to an inner part or tube 16 through the intermediary of a coiled spring 12 constituting a junction piece between the parts 10, 16. The spring has a spherical outer surface 14 engaging a corresponding spherical inner surface 11 of the socket 10 for universal motion about a center 11A. The socket 10 has a circular opening 15 to accommodate the tube 16.

Figure 3:
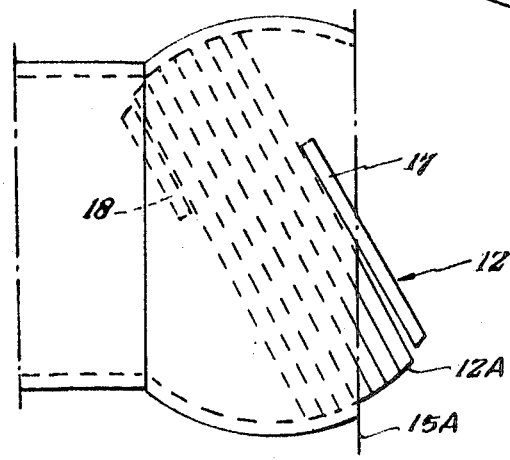
FIG. 3 is a view similar to FIG. 1 but showing the joint partly disassembled.

The opening 15 is necessarily smaller than the spring 12 i.e. its diameter is smaller than the diameter of the sphere defining the surface 14, so that the spring 12 is retained in the socket. However, the diameter of the opening 15 is made as large as possible so that the spring can be radially contracted for the purpose of being passed through the opening 15 for removal from or insertion into the socket. This can in fact be done relatively easily by a "screwing" operation comprising the steps of (a) turning the spring so that its axis lies at a substantial angle to the plane 15A (FIG. 3) of the opening 15, i.e. so that a portion 12A of the spring projects from the opening, (b) pulling the first turn, 17, of the spring through the opening and placing it on the outside of the socket substantially as shown in FIG. 3, and (c) grasping the spring at the portion 12A and turning it about its axis in the sense so that the spring is progressively screwed to the outside of the socket. A corresponding operation is employed to insert the spring into the socket. For the purpose of such an operation it is of course necessary that the exterior of the socket is also substantially spherical and that the socket is of moderate wall thickness. Basically the operation requires that the spring is contracted radially to the diameter of the opening 15 and to this end it is necessary for the stiffness of the spring to be related to that diameter. In the illustrated example the spring was made of a spring steel having 14 percent tungsten (this being a heat-resisting spring steel) and the joint had the following dimensions:

| | |
|---|---|
| Max. diameter of spring 12 | 2.600 inch. |
| Max. radial thickness of spring 12 | 0.150 inch. |
| Wall thickness of socket 10 | 0.072 inch. |
| Diameter of opening 15 | 2.430 inch. |

Instead of relying on the manual screwing action described, a tool (not shown) may be provided by which the first and last spring turn, the latter is denoted 18, can be held and a screwing action be imparted to, say, the first turn to bring about the necessary contraction of the spring for removal through the opening 15.

The spring is so dimensioned that the diameter of its surface 14 is an interference fit with, i.e. is slightly larger than, the diameter of the surface 11 so that when the spring is assembled in the socket the surface 11 keeps the spring turns slightly pressed together both radially and axially without however engaging the inner part 16. In this way manufacturing tolerances are taken up, and a certain amount of resilient preloading of the joint is achieved. On the other hand, selected turns, preferably the first and last turns 17, 18, are made of smaller inner diameter than the remaining turns, so as to be able to grip the inner part 16 and take up any slack relative thereto. Simultaneously, the smaller diameter of said selected turns makes it possible for them to engage shoulders 19 on the inner part 16 to support the latter against axial movement relative to the spring.

The turns 17, 18 are referred to as "inner turns" while the turns engaging the outer part are referred to as "outer turns."

The joint described is particularly suited to sockets which, like the one illustrated, is formed of sheet metal tubing by spinning or fluid-pressure forming and where the accuracy of the surface 11 may be relatively low and where the ability of the spring to take up dimensional tolerances is therefore useful. A particular use of the joint is in the exhaust piping of an internal combustion engine and in like applications where thermal expansion has to be accommodated.

Figure 2:
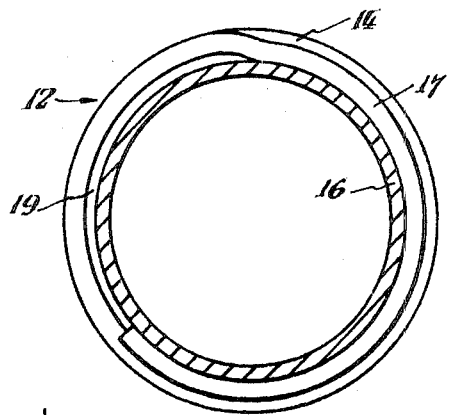
FIG. 2 is a section on the line II-II in FIG. 1.
Figure 4:
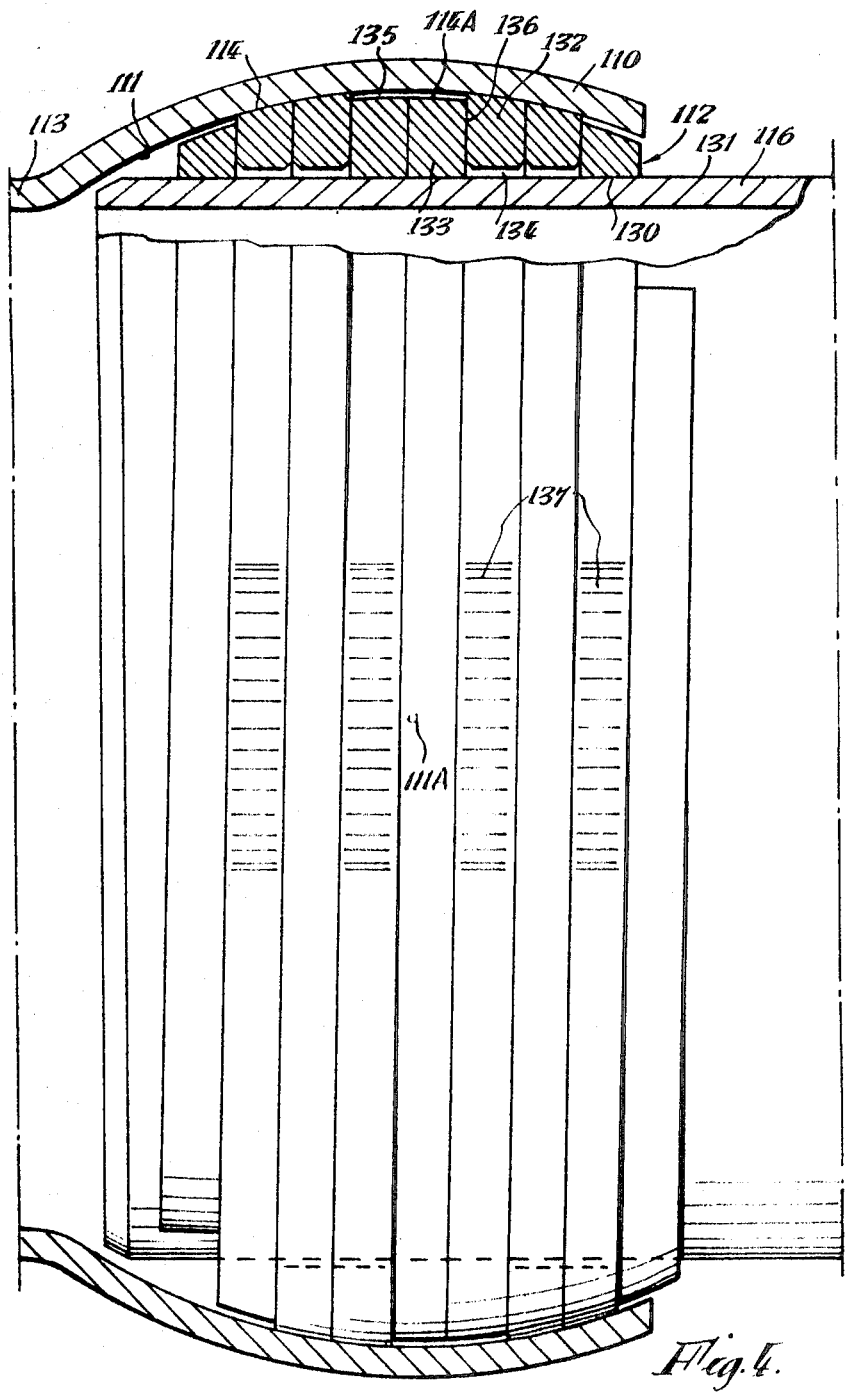
FIG. 4 is a view similar to FIG. 1 but drawn to an enlarged scale and showing a modification.

Referring to FIGS. 4 and 5, there is shown a joint essentially the same as that shown in FIGS. 1 to 3 but more specifically designed for good sealing properties between the inner and outer parts. An outer part or socket 110, provided at one end of a tube 113, is connected to an inner part or tube 116 through the intermediary of a coiled spring 112 constituting a junction piece between the parts 110, 116. The spring 112 has a spherical outer surface 114 engaging a corresponding spherical inner surface 111 of the socket 110 for universal motion about a center 111A. The spring 112 has a cylindrical inner surface 130 whereby to engage the corresponding cylindrical outer surface 131 of the part 116.

In order to make it possible for the engagement between the spring 112 and both parts 110, 116 to be resilient, the spring has outer turns 132 dimensioned to press resiliently outwardly against the surface 114 and inner turns 133 dimensioned to press resiliently inwardly on to the surface 131. The outer turns 132 have a slight clearance 134 with the surface 131 and the inner turns 133 have a slight clearance 135 with the surface 114. The clearance 134 is just sufficiently large to avoid contact between the turns 132 and the surface 131 having regard to manufacturing tolerances between the spring 112 and both parts 110 and 116. The same applies to the clearance 135.

The engagement between the spring 112 and both the surfaces 114 and 131 ensures peripheral sealing contact between the spring and the parts. For radial sealing between the turns it is necessary that the turns contact each other. Especially, it is necessary to have contact between adjacent turns 132, 133 as at 136 to prevent escape of pressure from a clearance 134 to the adjacent clearance 135. To this end the spring 112 is made to have contacting turns when free. Also, in use, fluid pressure differences across the joint operate to push the turns together axially so that the joint inherently tends to be pressure tight.

The change in the shape of the spring from the smaller radius of the turns 133 to the larger radius of the turns 132 is shown to occur at an intermediate portions 137 of the spring. It will be appreciated that, for satisfactory radial sealing, the inner and outer turns must radially overlap the portion 137, and for satisfactory peripheral sealing there must be at least one turn 132 and one turn 133 each extending over not less than 360° away from a portion 137 between them.

The spring 112 may be made of spring wire 139 being wound around a mandrel 140 (FIG. 6) having diameters 141, 142 to suit the diameters of the respective turns 132, 133 and including portions 143 for forming the portions 137 of the spring. The difference in the diameters of the portions 141, 142 is relatively small, e.g. of the order of 0.020 inch for a spring of 2-inch maximum diameter. It is therefore not difficult to remove the spring from the mandrel after the coiling operation. After the usual hardening operation, the spring is driven on to a cylindrical mandrel and the surface 114 is ground to a diameter defining an interference fit with the surface 111. When the cylindrical mandrel is removed, the external envelope of the spring then appears as shown in FIG. 4, i.e. the turns 133 have external surfaces 114A slightly spaced from but parallel to the surface 114 to define the clearances 135. Thereafter the internal surface 130 of the spring is ground to a diameter defining an interference fit with the diameter of the surface 131.

It will be apparent that the sealing pressure between the turns 132, 133 and the respective surfaces 114, 131 depends on the stiffness of the spring and on the extent of deflection of the spring necessary to accommodate said interference fits. In the present example, the spring does not engage shoulders on the inner part 116 and the latter is free to slide axially in the spring to accommodate thermal or other axial movement.

Like the spring 12, the spring 112 is made of a resilient metallic material, e.g. heat-resistant spring steel, to make it possible for the seal defined by the spring to maintain its sealing properties at relatively high temperatures. Also like the spring 12, the spring 112 may be removable through the opening 115 but this is not essential; the sockets 10 or 110 may for example be of split design, i.e. made in halves which can be assembled around the spring 12 or 112 respectively.

The invention is not restricted to a ball and socket joint. The outer part 10 or 110 may have a cylindrical surface whereby to engage spring turns defining a cylindrical outer surface of the spring.

I claim:

1. A joint comprising a hollow outer part defining an interior surface, an inner part arranged within the outer part and defining an exterior surface, and a coiled spring having a first turn resiliently engaging one of said surfaces while being clear of the other surface and two second turns situated at opposite sides of the first turn and resiliently engaging the other surface while being clear of the one surface the turns each engaging the respective surfaces over not less than 360°, the spring being made of a wire of flat-sided cross section, and adjacent first and second turns overlapping each other radially and contacting each other axially at the flat sides of said cross section.

2. A joint according to claim 1 comprising an intermediate portion extending clear of said surfaces between adjacent first and second turns, said adjacent turns each overlapping the intermediate portion and contacting it at the flat sides of said cross section.

3. A joint according to claim 1 wherein said interior surface is spherical thereby to support the parts for universal motion.

4. A joint according to claim 7 wherein the hollow outer part is dimensioned to define an opening which is smaller than the outer diameter of said outer turn, and wherein the spring is dimensioned in relation to the opening to be radially contractable for being passed therethrough. spring is dimensioned in relation to the opening to be radially contractable for being passed therethrough.